(12) United States Patent
Sirovskiy et al.

(10) Patent No.: US 10,806,546 B2
(45) Date of Patent: Oct. 20, 2020

(54) SYSTEMS AND METHODS OF IDENTIFYING AND TRACKING DENTAL MOLDS IN AUTOMATED ALIGNER FABRICATION SYSTEMS

(71) Applicant: Ormco Corporation, Orange, CA (US)

(72) Inventors: Yevgeniy Sirovskiy, Castro Valley, CA (US); Artem Borovinskih, San Jose, CA (US); Kenneth A. Phelps, Chino Hills, CA (US)

(73) Assignee: Ormco Corporation, Orange, CA (US)

( * ) Notice: Subject to any disclaimer, the term of this patent is extended or adjusted under 35 U.S.C. 154(b) by 519 days.

(21) Appl. No.: 15/463,564

(22) Filed: Mar. 20, 2017

(65) Prior Publication Data

US 2018/0263730 A1  Sep. 20, 2018

(51) Int. Cl.
  *A61C 7/00* (2006.01)
  *A61C 7/08* (2006.01)
  *A61C 13/20* (2006.01)

(52) U.S. Cl.
  CPC .............. *A61C 7/002* (2013.01); *A61C 7/08* (2013.01); *A61C 13/20* (2013.01); *A61C 2204/005* (2013.01)

(58) Field of Classification Search
  CPC .............................................. A61C 2204/005
  See application file for complete search history.

(56) References Cited

U.S. PATENT DOCUMENTS

| 3,960,471 A * | 6/1976 | Medendorp ............. B29C 51/34 425/388 |
| 6,976,627 B1 * | 12/2005 | Culp ........................ G06K 7/10 235/462.01 |
| 9,691,110 B2 | 6/2017 | Boronvinskih et al. |
| 2005/0082703 A1 * | 4/2005 | Wrosz ...................... A61C 7/00 264/16 |
| 2006/0127853 A1 * | 6/2006 | Wen ......................... A61C 7/00 433/213 |
| 2006/0127858 A1 * | 6/2006 | Wen ....................... A61C 9/002 433/213 |

(Continued)

FOREIGN PATENT DOCUMENTS

WO  2006084079 A2  8/2006

OTHER PUBLICATIONS

International Searching Authority, Search Report and Written Opinion in International Application No. PCT/US2017/023176, dated Dec. 21, 2017.

*Primary Examiner* — Cachet I Proctor
(74) *Attorney, Agent, or Firm* — Wood Herron & Evans LLP

(57) ABSTRACT

An aligner fabrication system combines design data and material to form a plurality of dental molds with which a plurality of aligners are formed. The aligner fabrication system includes a build assembly that defines a build surface on which the dental molds are formed. The build assembly is constructed of a plurality of individual build platforms that are removably coupled together. Each individual build platform is associated with an identification entity. The dental molds are formed on the build surface. One dental mold is formed on one individual build platform. The design data associated with the one dental mold is linkable to the identification entity on the one individual build platform.

32 Claims, 10 Drawing Sheets

(56) References Cited

U.S. PATENT DOCUMENTS

| | | | |
|---|---|---|---|
| 2006/0134580 A1* | 6/2006 | Raby | A61C 13/16 433/213 |
| 2006/0240374 A1* | 10/2006 | Wen | A61C 7/08 433/24 |
| 2009/0173443 A1* | 7/2009 | Kozlak | B29C 64/135 156/303.1 |
| 2014/0315153 A1* | 10/2014 | Kitching | A61C 7/002 433/213 |
| 2016/0023249 A1 | 1/2016 | Culp et al. | |
| 2017/0144360 A1* | 5/2017 | Moore, III | B29C 51/18 |

* cited by examiner

SYSTEMS AND METHODS OF IDENTIFYING AND TRACKING DENTAL MOLDS IN AUTOMATED ALIGNER FABRICATION SYSTEMS

TECHNICAL FIELD

The present invention relates generally to the field of systems and methods for manufacturing orthodontic appliances, and more particularly to systems and methods usable in aligner fabrication systems.

BACKGROUND

Orthodontics is the practice of manipulating teeth to correct malocclusions between the teeth of the upper and lower dental arches. Typically, treatment of malocclusions includes the use of an orthodontic appliance that applies corrective forces to the teeth. Over time, these corrective forces coerce the teeth to move into their orthodontically correct, aesthetic orientations.

One way of applying corrective forces is through the use of what are commonly referred to as "braces." These are often referred to in the industry as orthodontic brackets. Treatment using brackets includes attaching a bracket to each of the teeth being treated. These brackets are then coupled to an archwire. The archwire may be coupled to the brackets using ligatures. Ligatures are typically small elastomeric o-rings that retain the archwire within a slot in the bracket. The archwire is resilient and exerts corrective forces on the teeth via the brackets. During treatment with brackets, the patient must periodically visit the orthodontist to replace the archwire with a new archwire, which is typically larger in cross-sectional dimension.

As an alternative to braces, which remain adhered to the patient's teeth during the entire treatment, orthodontists may utilize orthodontic appliances referred to as "dental aligners," or simply "aligners." Aligners are supplied as a series of removable appliances that incrementally reposition the patient's teeth from an initial orientation through a series of intermediate orientations to their orthodontically correct, aesthetic orientations.

Patients being treated with aligners can insert and remove the aligners at will, and therefore do not need to visit the orthodontist for adjustments. Rather, when the currently worn aligner has moved the teeth to at or near the final orientation for that aligner, the patient begins using the next aligner in the series according to a treatment plan.

To fabricate aligners, the orthodontist first obtains a computer model of the patient's dentition. As an example, this model may be generated by taking an impression of the dentition and scanning the impression into a computer. Alternatively, an intraoral scanner can be used to create a computer model of the patient's dentition without the need for taking impressions. Once the computer model has been obtained, the orthodontist may determine orthodontically correct, aesthetic orientations of the patient's teeth. Multiple computer models may then be generated, with each model corresponding to an incremental orientation of the patient's teeth from the initial orientation to the corrected, aesthetic orientation. The incremental orientations from initial to final orientation move the patient's teeth according to a proposed treatment plan.

Treatment plans typically include numerous stages of movement of the teeth. Each stage may be produced by a single aligner. Depending on the degree of tooth movement, treatment plans may include a plurality of aligners, for example, twenty or more, that are worn in a predetermined sequence in accordance with a treatment plan. Thus, each patient may utilize many aligners. Each aligner is patient specific and is usable only in sequence.

Fabrication of the aligners involves thermoforming plastic sheets onto a mold that is a model of the patient's teeth. The molds can be built directly from virtual models, such as via a stereolithography (SLA) machine or other rapid prototyping machine, or be cut from bulk material via CNC machining. Direct building typically occurs on a building platform. A series of positive molds are built. Each mold corresponds to a specific position of the patient's teeth in the future and so is a three-dimensional reproduction of the patient's teeth at a particular target orientation during treatment.

During the mold building process, identification information specific to the patient and mold, and other information, is often attached to or built on each mold. Before the molds are transferred to aligner fabrication, the molds are first removed from the building platform and transferred to a tray or mold carrier.

All downstream aligner fabrication processes, such as thermoforming, laser marking, and trimming are performed on each mold after it is transferred from the tray. Once the process is complete, the mold is transferred back to the tray. In this process, the mold itself carries identifying information and so is trackable based on that information. Following aligner fabrication, and after the identifying information carried by the mold is transferred to the aligner, for example, by laser marking, the molds and trays are no longer needed and can be disposed of.

While these processes have been generally successful, there remain problems, particularly as to reliability of the identifying information. It is not uncommon for an aligner manufacturer to simultaneously manufacture a plurality of aligners for a plurality of patients in an automated process. Tracking and marking the aligners during manufacturing is fundamental to making certain that they are packaged and distributed to the proper patient in a predetermined order. There is a need for systems and methods to improve reliably of the identifying information that are usable in aligner fabrication systems.

SUMMARY OF THE INVENTION

The present invention overcomes the foregoing and other shortcomings and drawbacks of the identifying information heretofore known for use in aligner manufacturing. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, an aligner fabrication system combines design data and material to form a plurality of dental molds with which a plurality of aligners are formed. The aligner fabrication system includes a build assembly that defines a build surface on which the dental molds are formed. The build assembly is constructed of a plurality of individual build platforms that are removably coupled together. Each individual build platform is associated with an identification entity. Each identification entity is unique to a particular individual build platform.

In one embodiment, when the dental molds are formed on the build surface, one dental mold is formed on one individual build platform. That is, there is a one-to-one correlation between the dental molds and the individual build platforms.

In one embodiment, the design data associated with the one dental mold is linkable to the identification entity on the one individual build platform.

In one embodiment, the build assembly is capable of being disassembled into separate individual build platforms and reassembled from separate individual build platforms.

In one embodiment, the individual build platforms abut one another in the build assembly.

In one embodiment, during aligner formation, a workpiece is formed over the one dental mold on the one individual build platform.

In one embodiment, the identification entity is located on the individual build platform so that the identification entity is substantially uncovered when the workpiece is formed over the one dental mold.

In one embodiment, the identification entity is an RFID tag.

In one embodiment, the system further includes a platform processing system that removes the one dental mold from the one individual build platform. The platform processing system assembles the one individual build platform with other individual build platforms to form the build assembly.

In accordance with another aspect of embodiments of the present invention there is an aligner fabrication system that forms a plurality of aligners from a plurality of dental molds. Design data is associated with the dental molds. The aligner fabrication system includes a plurality of individual build platforms with one dental mold on one individual build platform, each individual build platform having an identification entity.

In one embodiment, design data related to the one dental mold is linkable to the identification entity on the one individual build platform.

In one embodiment, during forming of one aligner, a workpiece is formed over the one dental mold on the one individual build platform.

In one embodiment, the identification entity is located on the individual build platform so that the identification entity is substantially uncovered when the workpiece is formed over the one dental mold.

In one embodiment, the aligner fabrication system further includes a platform processing system that removes the one dental mold from the one individual build platform. The platform processing system assembles the one individual build platform with other individual build platforms to form a build assembly.

In accordance with another aspect of embodiments of the present invention, a method of manufacturing a plurality of aligners includes forming a plurality of dental molds on a build assembly that defines a build surface. The build assembly includes a plurality of individual build platforms that are removably coupled together with each individual build platform being associated with an identification entity.

In one embodiment, forming produces one dental mold on one individual build platform.

In one embodiment, design data is associated with the one dental mold, the method further including linking the design data to the identification entity on the one individual build platform.

In one embodiment, following forming, the method further includes disassembling the build assembly into separate individual build platforms.

In one embodiment, the method further includes transferring the one dental mold and the one individual build platform to an aligner formation process and forming a workpiece over the one dental mold on the one individual build platform to produce an aligner.

In one embodiment, following forming the workpiece, the method further includes marking the aligner with a code based on design data associated with the identification entity.

In one embodiment, the method further includes cleaning the one dental mold from the one individual build platform.

In one embodiment, the method further includes assembling the one individual build platform with other individual build platforms into a build assembly that defines a build surface for building molds and repeating the forming of a plurality of molds.

BRIEF DESCRIPTION OF THE DRAWINGS

The accompanying drawings, which are incorporated in and constitute a part of this specification, illustrate embodiments of the invention and together with the detailed description given below, explain various aspects of the invention.

DETAILED DESCRIPTION

Figure 1:
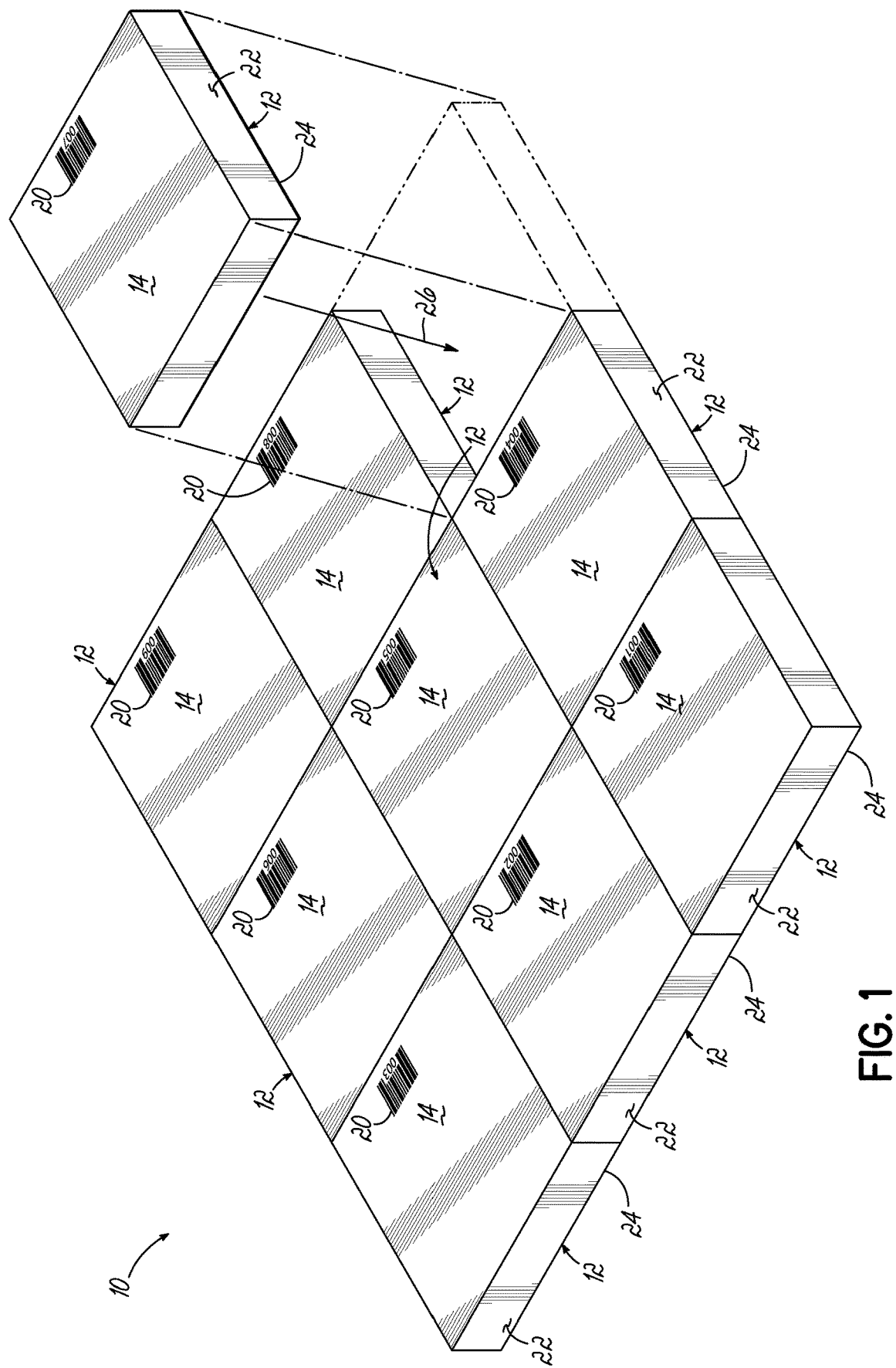
FIG. 1 is a perspective view of a plurality of individual build platforms assembled in a build assembly according to one embodiment of the invention.

Referring to FIGS. 1-11, in an exemplary embodiment of the invention, a system and a method for tracking and identifying dental molds is described. In general, embodiments of the invention enable a complete end-to-end tracking and identification of molds used during the manufacturing of aligners. The exemplary system essentially marries a mold with a build platform during aligner fabrication. That is, the mold and corresponding platform travel together from an initial mold building process and through at least a portion of the aligner fabrication process. Once the aligner is removed from the mold, the relationship between the mold and the corresponding build platform may end. The mold may be removed from the build platform.

During the aligner fabrication process, identifying information associated with an individual build platform may be linked to the corresponding mold. This information may be transferred to an aligner manufactured from that mold-platform pair by a laser marking process. Once the aligner is separated from the mold, the aligner fabrication is complete. The build platform may be recycled. The identifying information and other data that may be collected during manufacturing may be erased. The individual build platform may be reused. During the next building/fabrication process the identifying information of the individual build platform is associated with a new mold and a new aligner manufactured from that mold. Advantageously, embodiments of the system eliminate placement of identifying information on the individual molds and thus solves the problems associated with placing information on each mold, which is typically made of a fragile material.

To these and other ends, and with reference now to FIGS. 1-4, in one embodiment of the invention, a system for manufacturing aligners includes a build assembly 10 that is a collection of a plurality of individual build platforms 12. The individual build platforms 12 are removably coupled together. In other words, the individual build platforms 12 are separable from one another so that they may be transferred through an aligner fabrication process as separate components. Each of the build platforms 12 may abut at least one adjacent build platform 12. The collection of individual build platforms 12 provides a build surface 14 onto which a plurality of molds 16 (shown in FIGS. 2 and 3) may be built during a mold building process described below in conjunction with FIG. 4. Although not shown, a structural support may be first built on the individual build platform 12 prior to building each of the molds 16.

Once aligner fabrication is complete, the individual build platforms 12 may be reassembled into the build assembly 10. The build assembly 10 may therefore be disassembled and reassembled in the same or a different configuration with the same build platforms 12 or with different build platforms from other build assemblies (not shown).

In the exemplary embodiment shown, each of the individual build platforms 12 has the same configuration, that is, a rectangular configuration having the build surface 14, side surfaces 22 and a bottom surface 24. While a rectangular configuration is shown, embodiments of the invention are not limited to rectangles. The platforms 12 may have any number of geometric shapes. Each platform 12 may have a different shape than the adjacent platform 12. The individual build platforms 12 may be assembled side-to-side as is schematically represented by arrow 26 in FIG. 1 to form the build assembly 10. Each of the individual build platforms 12 may include one or more features that are configured to facilitate orientation and alignment of the individual build platforms 12 during aligner fabrication, described below.

Furthermore, in the exemplary embodiment, each of the sides 22 and/or bottom surface 24 may include a linking feature (not shown) that cooperates with a corresponding linking feature on an adjacent build platform 12. The linking feature may be built into the build platform 12 or be a separate component that is usable to secure one or more rows and columns of the build platforms 12 in the build assembly 10 together. The linking feature may permit the build assembly 10 to be assembled from many individual build platforms 12 and have sufficient handling strength so that the assembly 10 may be moved through the aligner fabrication process without inadvertent disassembly. While each of the individual build platforms 12 shown in FIG. 1 have the same configuration, embodiments of the present invention are not limited to the configuration shown or to each platform 12 having the same configuration. The build assembly 10 may therefore be an assembly of different shaped build platforms 12 that fit together in a puzzle-like configuration. This may accommodate a particular space-saving arrangement of molds that are to be built on the build surface 14.

Each of the individual build platforms 12 may be associated with an identification entity 20 that is unique to that specific build platform 12. The identification entity 20 may be linked to digital descriptive data for identifying and tracking the individual build platform 12 and the corresponding mold 16. This data may include specific patient identification, clinic identification, step number, case number, process parameter data, or other data associated with the mold 16 or build platform 12. The identification entity 20 is readable via a visual and/or machine inspection during manufacturing, as is described below.

Figure 2:
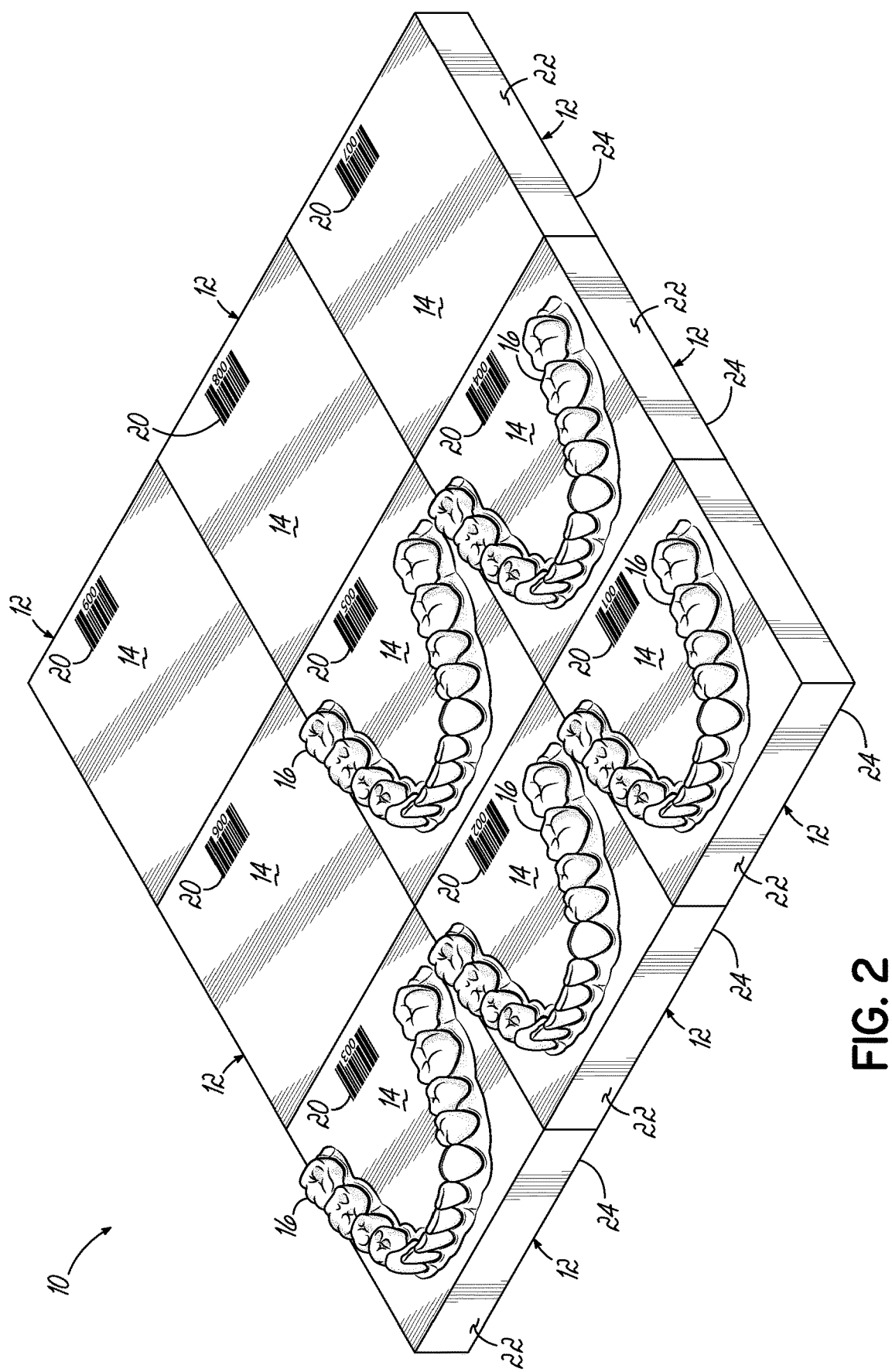
FIG. 2 is a perspective view of molds built on the build assembly platforms of FIG. 1 according to one embodiment of the invention.
Figure 3:
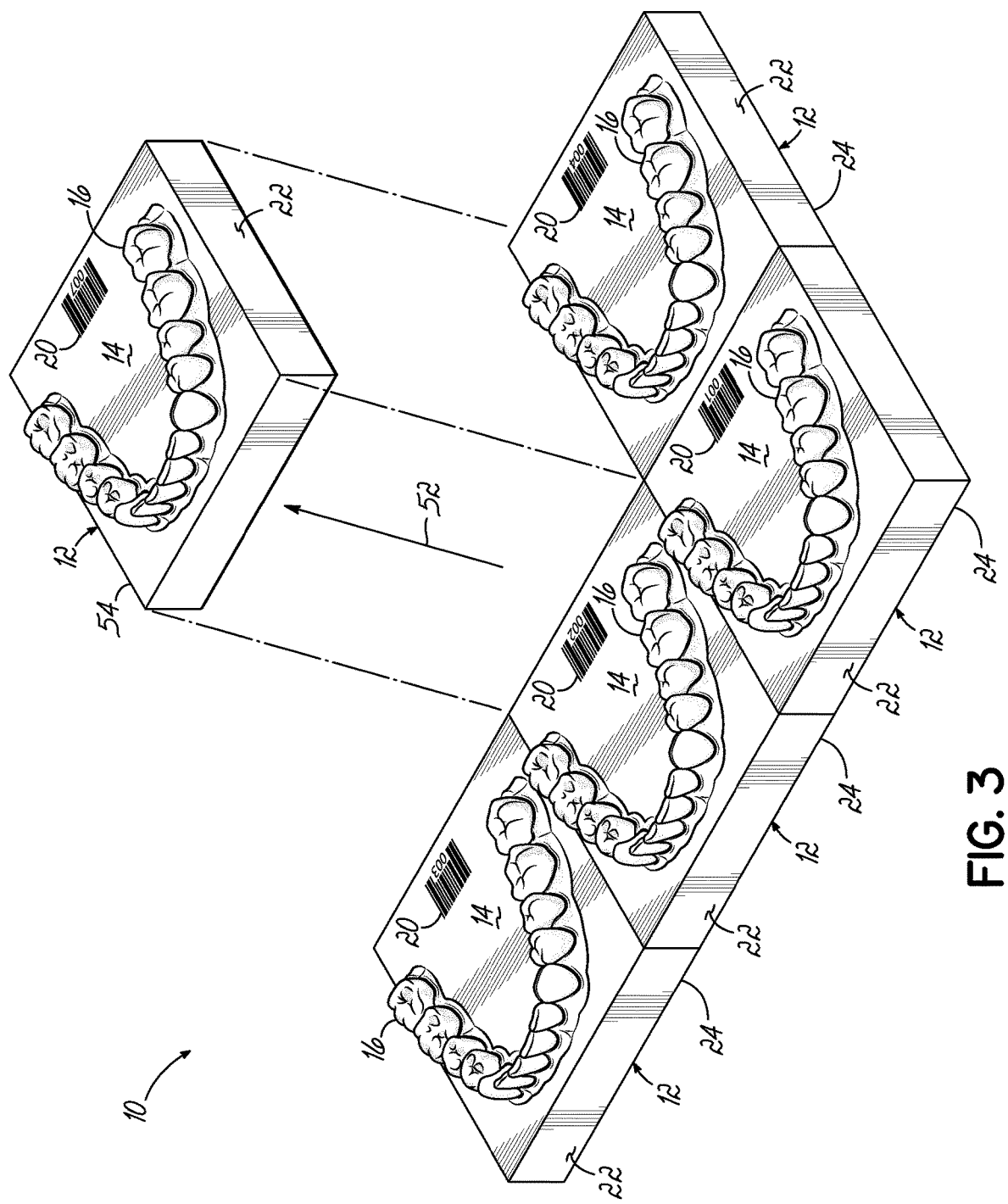
FIG. 3 is a perspective view of a partially disassembled build assembly according to one embodiment of the invention.

As shown in FIGS. 1-3, an identification entity 20 may be buried in a corresponding build platform 12 (e.g., an RFID tag may be disposed within the platform 12) and/or may be placed on or built into the build surface 14 of the build platform 12. By way of example, each individual build platform 12 in FIG. 1 includes a unique bar code and unique numerical identifier. In this way, the identification entity 20 may be easily and reliably accessed on the build platform 12 during mold fabrication and at each stage of aligner fabrication. Embodiments of the present invention are not limited to placement of the identification entity 20 on the build surface 14. For example, the identification entity 20 may be positioned on or built into any single one or each of the sides 14, 22, and 24. However, there is at least one identification entity 20 per build platform 12. For a build assembly 10 constructed of nine individual build platforms 12, for example, there may be at least nine unique identification entities 20. In the exemplary embodiment, the identification entity 20 may be in the form of a barcode that may be etched into the build surface 14. Other forms of identification entity 20 may be utilized, including by way of example only, and not limitation, RFID, three dimensional data matrix that represents a coded identification, or a textual, numeric, or other graphical identification or combinations thereof. Although not shown, each build platform 12 may have multiple entities associated with it and so may be visually inspected and/or inspected by automated means during the processes described below.

In one embodiment, the build assembly 10 may be made of a material that permits it to be releasably lockable (e.g., electromagnetically coupled) to a mold fabrication machine, described below. In addition, or alternatively, the build assembly 10 may include other features that permit it to be properly oriented and then held in a position during the build process. Furthermore, the material of each build platform 12 is made of a different material than the molds 16 and accordingly may be made of a sufficiently durable material, such as hardened steel, which enables it to be reused in multiple build operations. Advantageously, the identification entity 20 may be incorporated into a surface or made of a material that is durable and, for that reason, may be more reliably read. By contrast, text and other graphical information made of the mold material may be damaged during subsequent processes because the mold material is fragile and brittle and so can be easily damaged. Once damaged, the text or other graphical information may not be legible.

Figure 4:
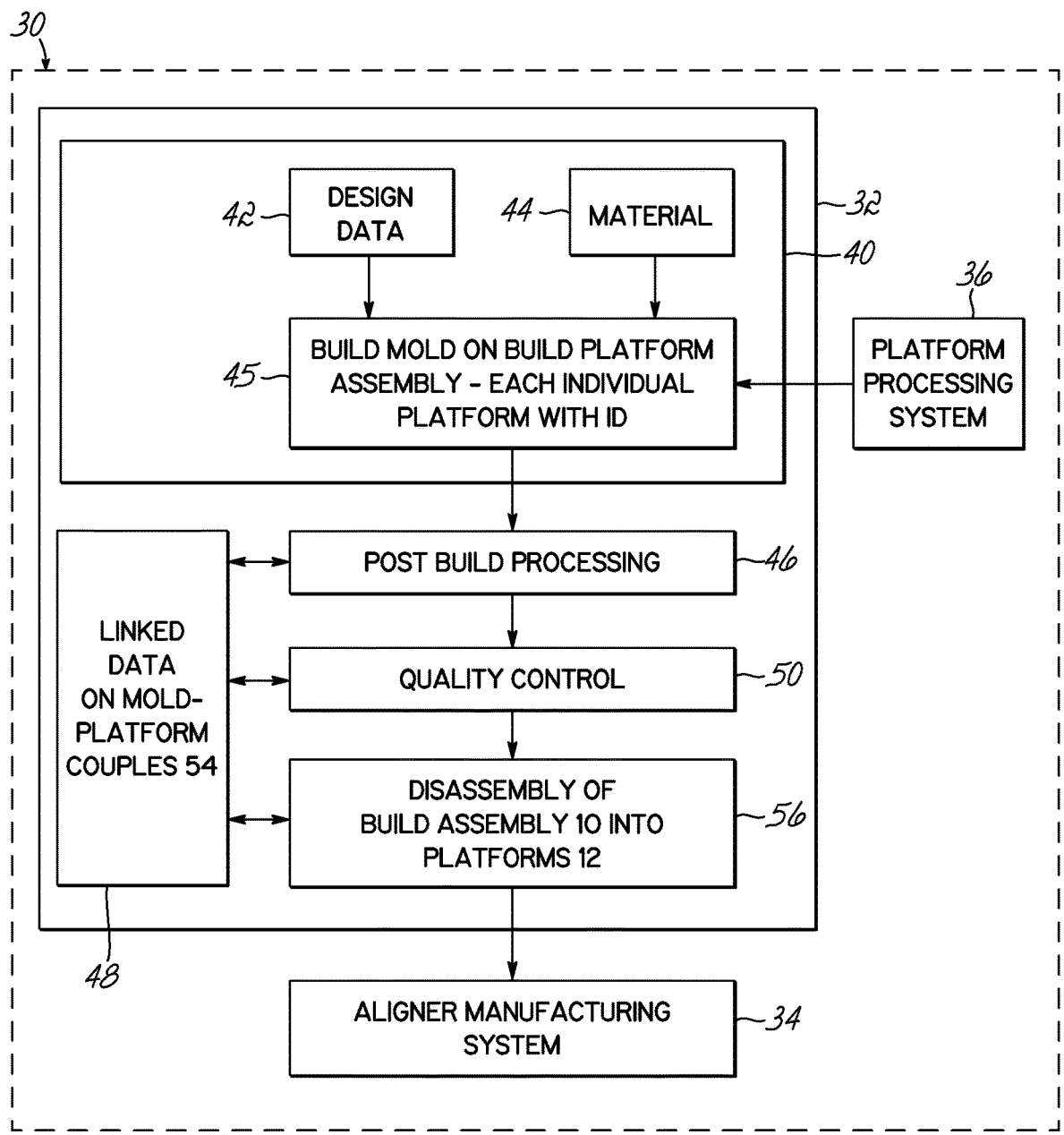
FIG. 4 is a schematic diagram illustrating a process for building molds on a build assembly according to one embodiment of the invention.

With reference to FIGS. 2 and 4, in one embodiment, an aligner fabrication system 30 may include a mold fabrication system 32, an aligner manufacturing system 34, and a platform processing system 36. In one embodiment the mold fabrication system 32 includes a mold fabrication machine 40. In general, this may include a rapid prototyping machine, such as a stereolithography (SLA) machine, a mask stereolithography machine, another additive technology machine (e.g., DLP or CLP), or a substractive technology machine (e.g., milling machine), that is capable of combining design data 42 and a mold material 44 to build one or more molds 16 on the build surfaces 14 of the build assembly 10 at 45. As shown, each mold 16 is built on a single build platform 12.

With this one-to-one relationship, information associated with the design data 42 of the particular mold 16 may be linked to the identification entity 20 of the corresponding build platform 12. The mold fabrication system 32 may then prepare linked data 48 for each of the mold-platform couples for later use by each of the systems 32, 34, 36. In other words, by way of example only, identification information regarding the patient, the orthodontist, the clinic, the aligner step number, case number, mold identification, among others, from the design data 42 of the mold 16 may be linked to the identification entity 20 of the build platform 12. In this way, because each of the molds 16 on the build assembly 10 is unique, that unique information may be tagged to the unique identification entity 20, for example in the linked data 48, and be shared with systems for the duration of the aligner manufacturing process. While FIG. 2 depicts the molds 16 being built sequentially, it will be appreciated that mold fabrication on each individual build platform 12 may proceed simultaneously. In one embodiment, none of the molds 16 are built including identification information on the mold itself.

With reference to FIG. 4, following the build process, described above, the mold fabrication system 32 may perform additional operations on the molds 16. By way of example only and not limitation, the mold fabrication system 32 may perform post-build processing at 46 and/or perform quality control on the molds 16 at 50. At some point between the mold fabrication system 32 and the aligner manufacturing system 34, the build assembly 10 is disassembled. The molds 16 are not removed from the corresponding individual build platform 12. Advantageously, according to embodiments of the invention, there is no need to transfer the molds to separate trays prior to aligner fabrication. It is believed that the process of transferred a mold-platform pair to and from aligner fabrication is more efficient than a process in which only the molds are transferred to and from a tray between each fabrication step.

In the exemplary embodiment shown in FIG. 4, the build assembly 10 is disassembled prior to exiting the mold fabrication system 32 at 56. This is shown schematically in FIG. 3 in which an arrow 52 depicts removal of a mold-platform couple 54. Each of the mold-platform couples 54 is transferred to the aligner manufacturing system 34 during which an aligner is formed on each of the mold-platform couples 54.

In one embodiment, and with reference to FIGS. 5-8, following disassembly of the build assembly 10, the individual mold-platform couples 54 may be transferred to an aligner manufacturing system 34. As shown, the linked data 48 for each of the mold-platform couples 54 is made available to the aligner manufacturing system 34 via the unique identification entity 20 associated with each of the mold-platform couples 54. That is, at any stage of the aligner manufacturing system 34, the information tagged to the unique identification entity 20 may be accessed. In this way, information contained within the linked data 48 may be accessed for any single one of the stations in the aligner manufacturing system 34. The aligner manufacturing system 34 forms an aligner 60 from each of the mold-platform couples 54.

Figure 5:
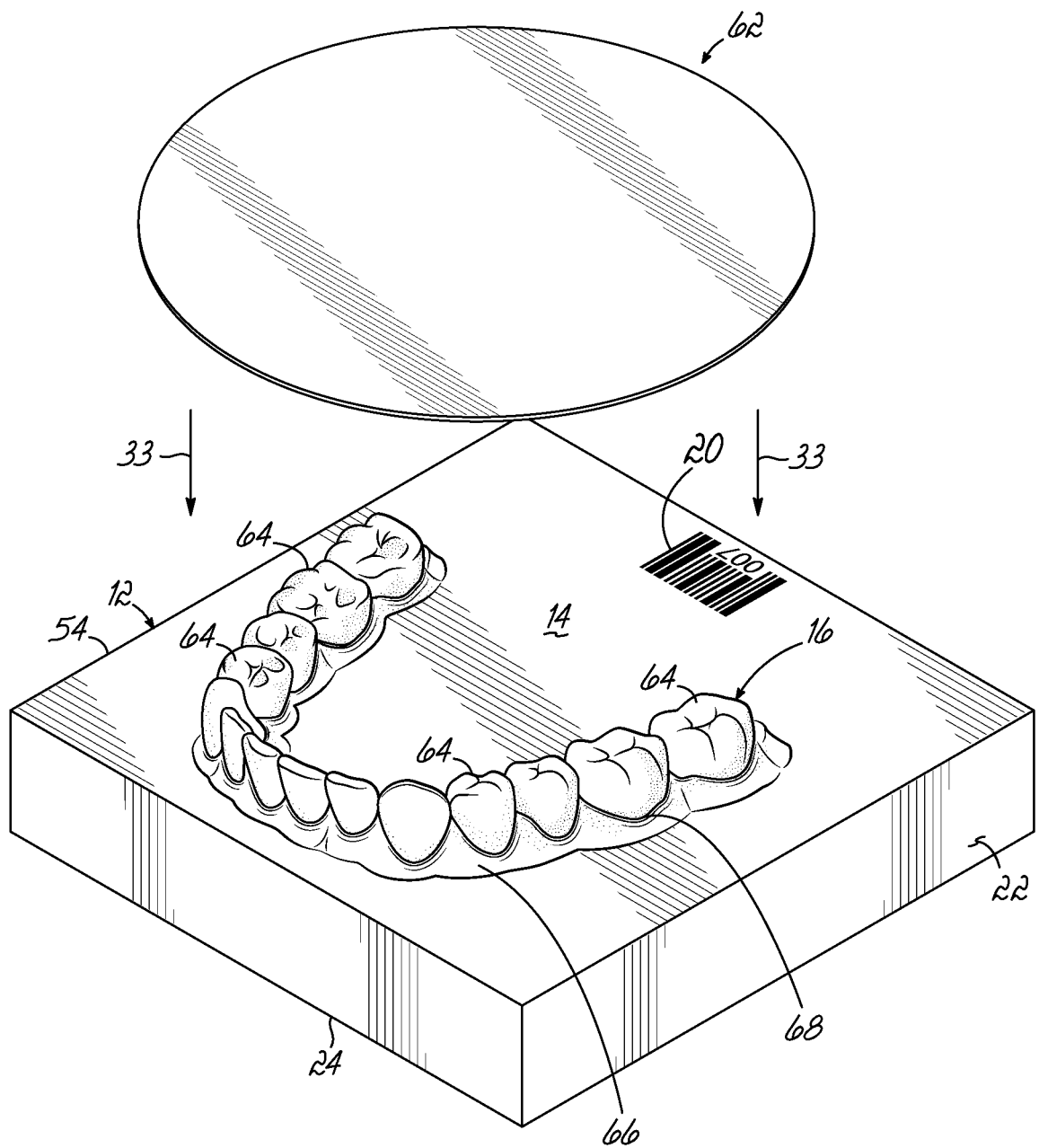
FIG. 5 is a perspective view of a workpiece in relation to a mold on a corresponding individual build platform prior to forming according to one embodiment of the invention.
Figure 7:
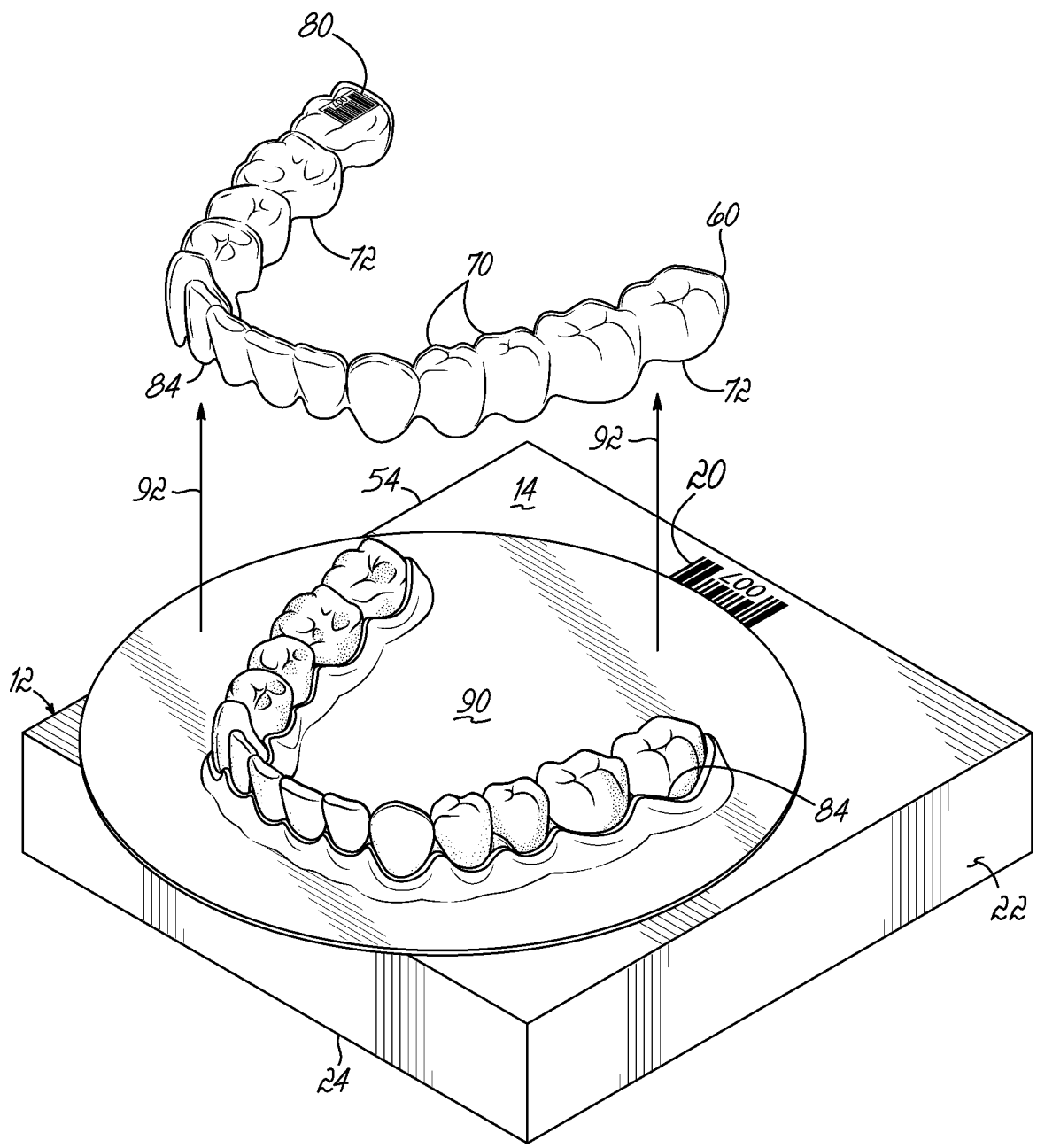
FIG. 7 is a perspective view of a mold on a corresponding individual build platform with an aligner according to one embodiment of the invention.
Figure 8:
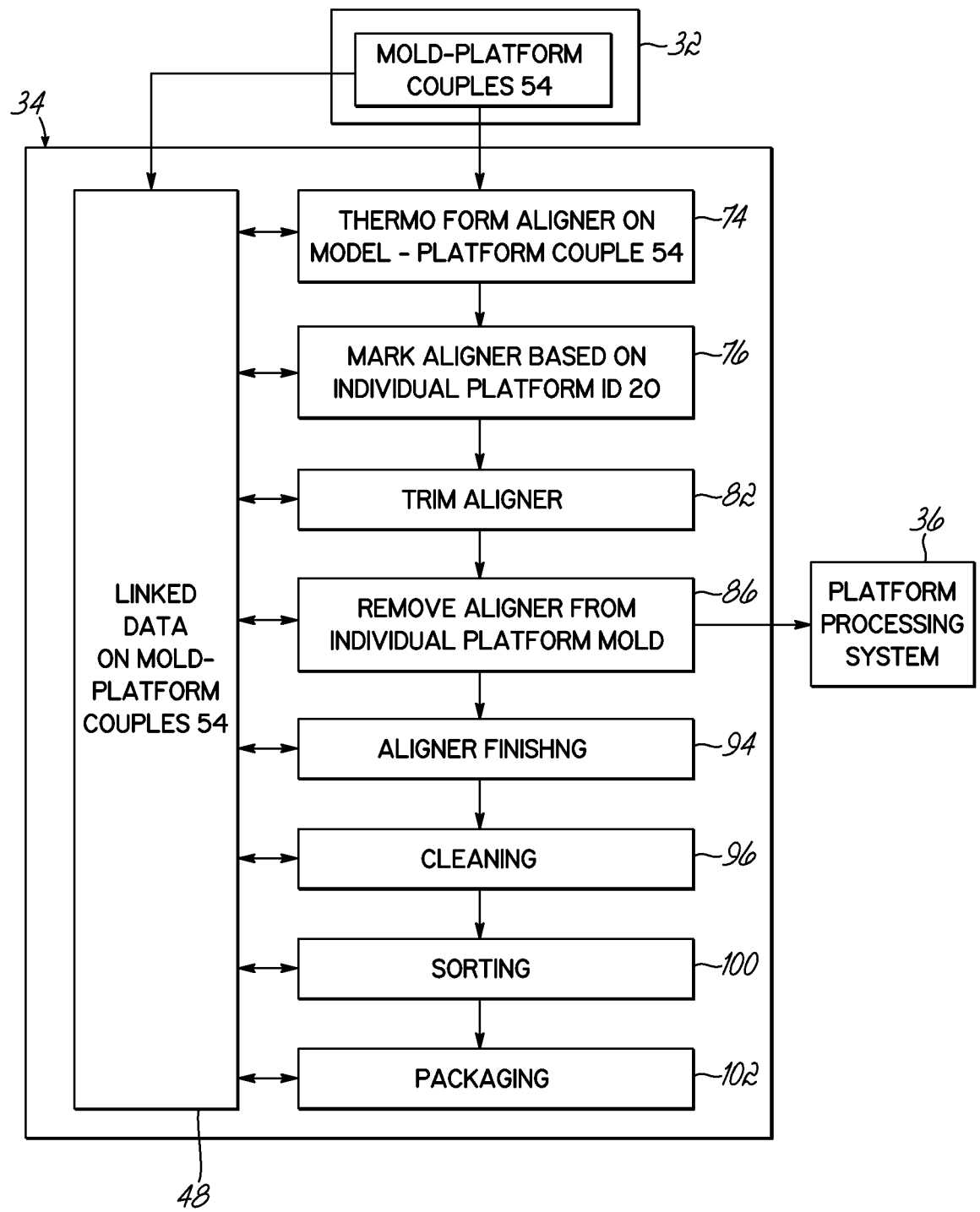
FIG. 8 is a schematic diagram illustrating a process for manufacturing aligners on individual build platforms according to one embodiment of the invention.

In that regard, with reference to FIGS. 5 and 8, in one embodiment, a process of forming the aligner 60 (FIG. 7) may include deforming a workpiece 62 with the mold 16. The mold 16 may include a plurality of projections 64 in the form of model teeth that extend from a model gum 66 and define a gingival margin 68. As such, each model tooth 64 may have an orientation that produces a cavity 70 in the dental aligner 60 with the gingival margin 68 providing a boundary for an edge 72 of the aligner 60.

The workpiece 62 may be fabricated from any suitable formable material, and, in the exemplary embodiment, may be a sheet of a thermoplastic. As shown, the workpiece 62 may be circular and be of uniform thickness, though embodiments of the invention are not limited to that particular configuration.

Figure 6:
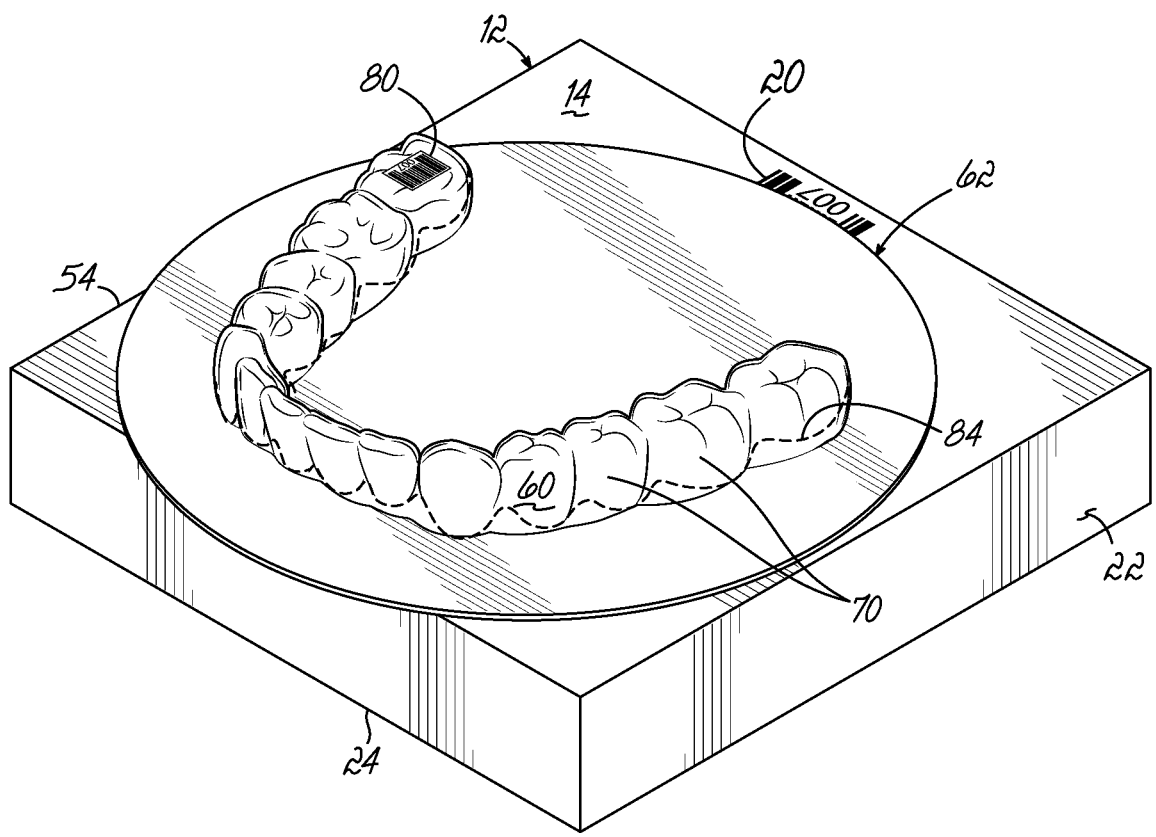
FIG. 6 is a perspective view of the workpiece and mold of FIG. 5 following forming according to one embodiment of the invention.

With reference to FIGS. 5, 6, and 8, in one embodiment, the aligner 60 is manufactured by pressing the mold 16 and the workpiece 62 together along a direction indicated by lines 33 in FIG. 5. The forming process may include heating the workpiece 62 until it softens and becomes pliable and then forcibly contacting the heated workpiece 62 with the mold 16 while removing any air gap between the workpiece 62 and the surface of the mold 16.

Engagement with the mold 16 may be enhanced using, for example, a plug (not shown) that urges the workpiece 62 into engagement with the mold 16 by applying pressure to the upper surface of workpiece 62. Engagement with the mold 16 may also be enhanced by introducing a pressurized gas (e.g., air) between the upper surface of workpiece 62 and the plug, and/or by introducing a vacuum between the lower surface of workpiece 62 and the mold 16.

To that end, in one embodiment, and with reference to FIGS. 6 and 8, forming the aligner 60 may include loading the workpiece 62 and the mold-platform couple 54 into a thermoforming machine at 74. The exemplary machine may include a heating element (not shown) to heat the workpiece 62 to a processing temperature prior to deforming the workpiece 62 over the mold 16. Once the workpiece 62 is brought to a processing temperature, pressure (e.g., direct or vacuum assisted) may be applied so that the workpiece 62 is deformed over the mold 16, as is generally shown in FIG. 6.

During the thermoforming process at 74, the identification entity 20 may be located outside the perimeter of the workpiece 62. This is shown best in FIGS. 6 and 7. Advantageously, the workpiece 62 does not cover a substantial portion of the identification entity 20. The workpiece 62 may not cover any portion of the identification entity 20. Thus, even with the workpiece 62 in the deformed condition, as is shown in FIG. 6, the identification entity 20 may be accurately and reliably read so that the linked data 48 associated with the specific mold-platform couple 54 can be reliably accessed and modified. Furthermore, the aligner manufacturing system 34 may include a marking system that receives data from the linked data 48 and marks the aligner 60 via a marking process at 76. For example, a laser system (not shown) may be used to mark the aligner 60 with a code or text 80. The code or text 80 may contain information from the linked data 48, such as a patient ID, a step number, processing parameters, mold-platform identification, or other data linked to the mold-platform couple 54.

Referring to FIGS. 7 and 8, once the workpiece 62 has cooled sufficiently (e.g., so that it is no longer pliable), it may be trimmed at 82. The trimming process may utilize data available in the linked data 48. For example, the linked data 48 for the mold-platform couple 54 may include CNC data that defines a trim boundary 84. A multi-axis milling machine (e.g., a four-axis or a five-axis CNC milling machine) may utilize the data to guide a tool along the trim boundary 84 by which the aligner 60 may be separated from the workpiece 62 as is generally shown by arrows 92 in FIG. 7 and indicated at 82 and 86 in FIG. 8. A waste portion 90 of the workpiece 62 together with the mold-platform couple 54 may be transferred to the platform processing system 36, described below.

Once the aligner 60 is removed, it may undergo further processing in the aligner manufacturing system 34. With continued reference to FIG. 8, this may include a finishing process at 94 and a cleaning process at 96. The aligner manufacturing system 34 may also sort the aligners at 100 and then package the sorted aligners at 102 for shipping to the patient or a clinician. Any single one of the processes of the aligner manufacturing system 34 may access data available in the linked data 48 which may be associated with the code or text 80 on the aligner 60.

Figure 9:
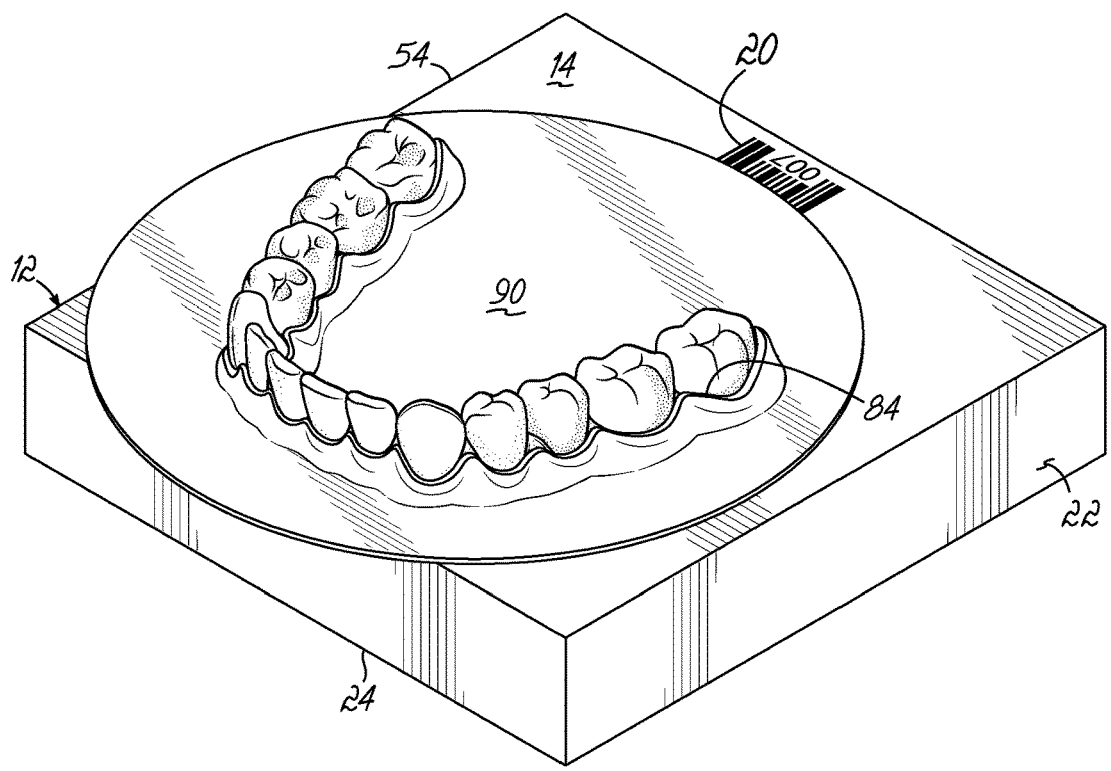
FIG. 9 is a perspective view of the individual build platform of FIG. 7 following removal of the aligner according to one embodiment of the invention.
Figure 10:
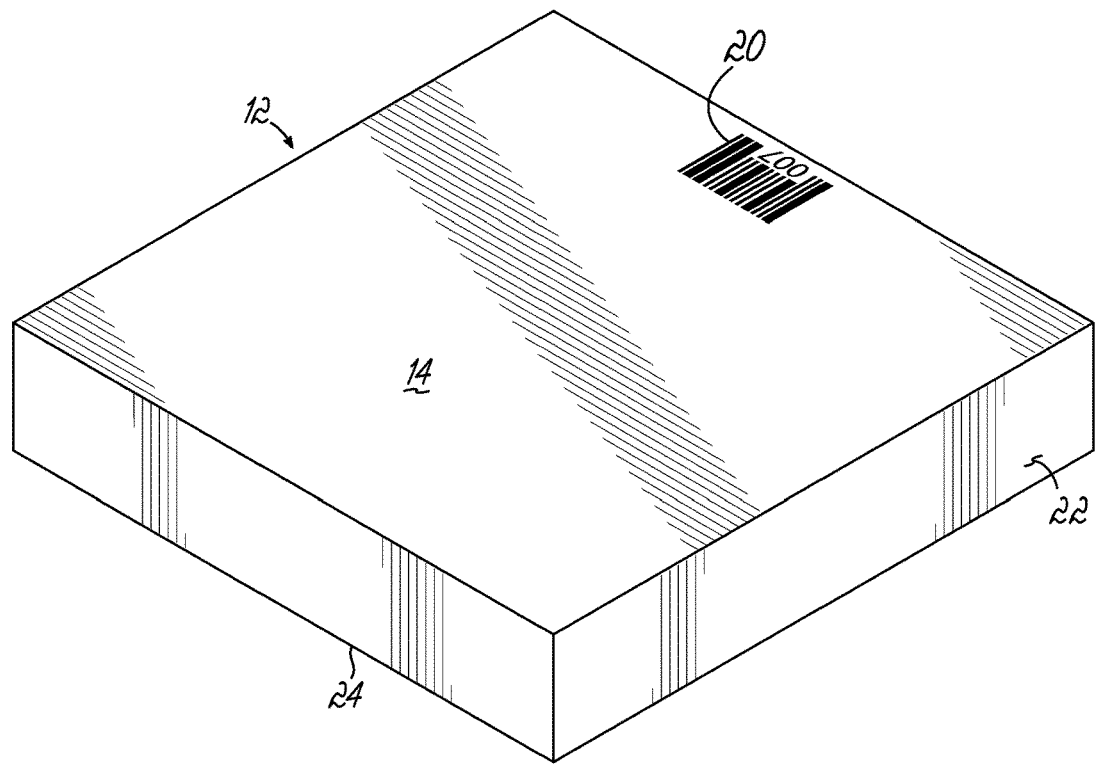
FIG. 10 is a perspective view of the individual build platform of FIG. 9 following mold removal according to one embodiment of the invention.
Figure 11:
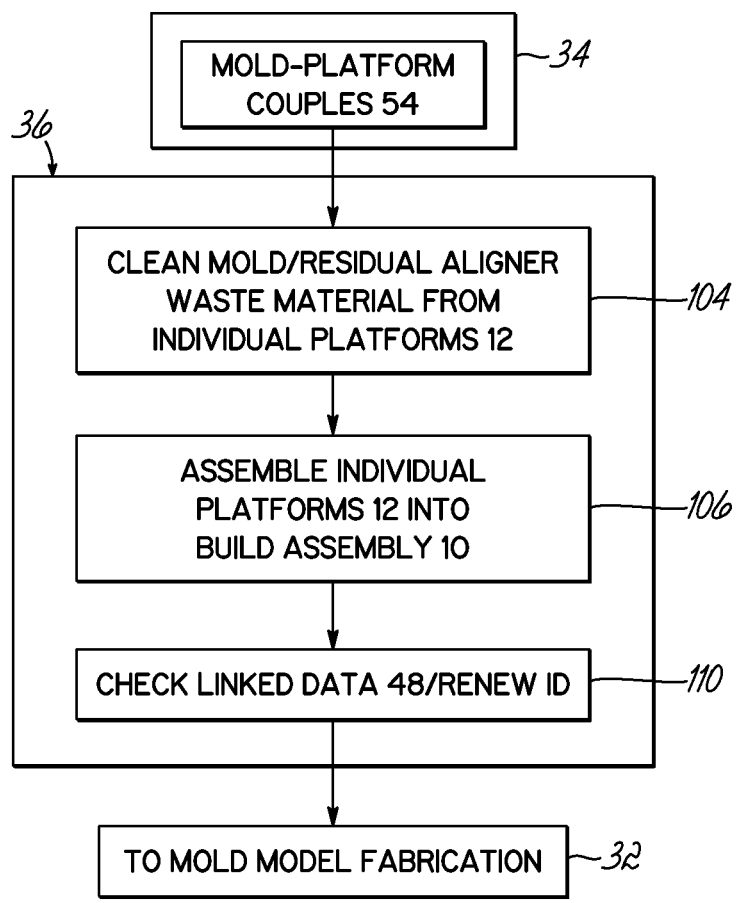
FIG. 11 is a schematic diagram illustrating post processing of individual build platforms according to one embodiment of the invention.

In one embodiment, and referring to FIGS. 9-11, each of the mold-platform couples 54 may be transferred to the platform processing system 36 in which the waste portion 90 may be removed from the mold-platform couple 54 at 104. This waste material may be recycled. The platform processing system 36 may also remove the mold 16 from the individual build platform 12 for disposal or recycling. The individual build platform 12 may be cleaned of any residual material. In that regard, the build surface 14 may be rinsed with a solvent and/or mechanically cleaned. Ultimately, the individual build platform 12 may be reassembled with other individual build platforms 12 at 106 to prepare the build assembly 10 as is shown in FIG. 1 for another mold build and aligner manufacturing process for a different patient.

With reference to FIG. 11 at 110, in one embodiment, the linked data 48 may be transferred to another location before it is dissociated from the identification entity 20. That is, during preparation of the individual build platforms 12, the identification entity 20 may remain the same. However, any association in the linked data 48 between the mold 16 and the individual build platforms 12 from the previous manufacturing process may be removed. This process may erase any data in the aligner fabrication system 30 associated with the identification entity 20 other than its association with a particular individual build platform 12.

While the present invention has been illustrated by a description of various embodiments and while these embodiments have been described in some detail, it is not the intention of the inventors to restrict or in any way limit the scope of the appended claims to such detail. Thus, additional advantages and modifications will readily appear to those of ordinary skill in the art. The various features of the invention may be used alone or in any combination depending on the needs and preferences of the user.

What is claimed is:

1. An aligner fabrication system that forms a plurality of aligners from a plurality of dental molds, each dental mold including a plurality of projections in the form of model teeth, design data being associated with the dental molds, the aligner fabrication system comprising:

a plurality of individual build platforms with one dental mold being associated with one individual build platform having a build surface onto which the one dental mold is configured to be built and over which an aligner is configured to be formed, each individual build platform having an identification entity that is not on the one dental mold.

2. The system of claim 1 further comprising:

a platform processing system that removes at least one dental mold from at least one individual build platform.

3. The system of claim 2 wherein the platform processing system is capable of assembling the plurality of individual build platforms to form a build assembly that defines a build surface on which the one dental mold is formed.

4. The system of claim 1 wherein design data related to the one dental mold is linkable to the identification entity of the one individual build platform.

5. The system of claim 1 wherein the identification entity is an RFID tag.

6. The system of claim 1 wherein during aligner formation, a workpiece is formed over the one dental mold on the one individual build platform.

7. The system of claim 6 wherein the identification entity is located on the one individual build platform so that the identification entity is substantially uncovered when the workpiece is formed over the dental mold.

8. The system of claim 1 wherein the identification entity is buried in the individual build platform.

9. The system of claim 1 wherein each individual build platform has a build surface onto which at least one mold of the plurality of molds is configured to be built during a mold building process and the identification entity is built into the build surface.

10. The system of claim 1 wherein each individual build platform has a build surface onto which at least one mold of the plurality of molds is configured to be built during a mold building process and the identification entity is directly on the build surface.

11. An aligner fabrication system that forms a plurality of aligners from a plurality of dental molds, design data being associated with the dental molds, the aligner fabrication system comprising:

a plurality of individual build platforms with one dental mold being associated with one individual build platform, each individual build platform having an identification entity, wherein the individual build platforms are removably coupled together to form a build assembly that defines a build surface on which the dental molds are to be formed.

12. The system of claim 11 wherein the individual build platforms abut one another in the build assembly.

13. The system of claim 11 wherein the build assembly is capable of being disassembled into the plurality of individual build platforms and reassembled from separate individual build platforms.

14. The system of claim 11 wherein the build surface intersects with at least one side of the individual build platform and when the individual build platforms are removably coupled together, the build surface is planar across the entirety of the build assembly.

15. The system of claim 11 wherein the individual build platforms are defined by at least one side and are removably coupled together side-to-side in the build assembly.

16. The system of claim 11 wherein each of the individual build platforms is reused to build dental molds for a plurality of different orthodontic patients.

17. A method of manufacturing a plurality of aligners comprising:
forming a plurality of dental molds on a plurality of individual build platforms with one dental mold being associated with one individual build platform, each individual build platform having an identification entity that is not on the one dental mold and each dental mold including a plurality of projections in the form of model teeth and over which an aligner is to be formed.

18. The method of claim 17 wherein forming produces one dental mold on one individual build platform.

19. The method of claim 18 wherein design data is associated with the one dental mold, the method further comprising:
linking the design data to the identification entity of the one individual build platform.

20. The method of claim 18 further comprising:
transferring the one dental mold and the one individual build platform to an aligner formation process.

21. The method of claim 18 further comprising:
forming a workpiece over the one dental mold on the one individual build platform to produce an aligner.

22. The method of claim 21 wherein following forming the workpiece, the method further comprises:
marking the aligner with a code based on design data linked to the identification entity.

23. The method of claim 18 further comprising:
cleaning the one dental mold from the one individual build platform.

24. The method of claim 23 further comprising:
forming a second dental mold on the clean individual build platform.

25. A method of manufacturing a plurality of aligners comprising:
forming a plurality of dental molds on a plurality of individual build platforms, each individual build platform having an identification entity, wherein prior to forming, the method further comprises:
assembling the plurality of individual build platforms into a build assembly that defines a build surface and forming the plurality of dental molds includes building the dental molds on the build surface.

26. The method of claim 25 wherein following forming, the method further comprises:
disassembling the build assembly into the plurality of individual build platforms.

27. An aligner fabrication system that forms a plurality of aligners from a plurality of dental molds, design data being associated with the dental molds, the aligner fabrication system comprising:
a plurality of individual build platforms with one dental mold being associated with one individual build platform, each individual build platform having an identification entity and wherein the individual build platforms are metallic.

28. An aligner fabrication system that forms a plurality of aligners from a plurality of dental molds, design data being associated with the dental molds, the aligner fabrication system comprising:
a plurality of individual build platforms with one dental mold being associated with one individual build platform, each individual build platform having an identification entity and wherein the individual build platforms are steel.

29. An aligner fabrication system that forms a plurality of aligners from a plurality of dental molds, design data being associated with the dental molds, the aligner fabrication system comprising:
a plurality of individual build platforms with one dental mold being associated with one individual build platform, each individual build platform having an identification entity and wherein the individual build platforms are electromagnetically couplable to a machine.

30. An aligner fabrication system that forms a plurality of aligners from a plurality of dental molds, design data being associated with the dental molds, the aligner fabrication system comprising:
a plurality of individual build platforms with one dental mold being associated with one individual build platform, each individual build platform having an identification entity and wherein each individual build platform includes a linking feature that is releasably couplable to a linking feature on another individual build platform, and when the individual build platforms are removably coupled together, form a build assembly that defines a build surface.

31. An aligner fabrication system that forms a plurality of aligners from a plurality of dental molds, design data being associated with the dental molds, the aligner fabrication system comprising:
a plurality of individual build platforms with one dental mold being associated with one individual build platform, each individual build platform having an identification entity and wherein the individual build platforms fit together in a puzzle-like configuration.

32. The system of claim 31 wherein the individual build platforms are rearrangeable in the puzzle-like configuration.

* * * * *